United States Patent
Gong et al.

(10) Patent No.: US 7,365,898 B2
(45) Date of Patent: Apr. 29, 2008

(54) SLOPING ELECTRODES IN A SPATIAL LIGHT MODULATOR

(75) Inventors: Cuiling Gong, Plano, TX (US); Larry J. Hornbeck, Van Alstyne, TX (US); Jason M. Neidrich, Fairview, TX (US)

(73) Assignee: Texas Instruments Incorporated, Dallas, TX (US)

( * ) Notice: Subject to any disclaimer, the term of this patent is extended or adjusted under 35 U.S.C. 154(b) by 65 days.

(21) Appl. No.: 11/498,910

(22) Filed: Aug. 2, 2006

(65) Prior Publication Data

US 2008/0030841 A1    Feb. 7, 2008

(51) Int. Cl.
G02B 26/00 (2006.01)
G02B 26/08 (2006.01)
G02B 6/26 (2006.01)
H02N 1/00 (2006.01)
H01L 21/00 (2006.01)

(52) U.S. Cl. ............... 359/291; 359/290; 359/295; 359/298; 310/309; 438/52; 385/18; 345/84; 345/85; 353/30

(58) Field of Classification Search ........ 359/290–295, 359/298, 299, 213, 214, 223–225, 238, 198, 359/244, 245, 302, 388, 872; 353/30, 84, 353/98; 345/32, 84, 85; 310/309; 385/15–18; 324/525; 348/771; 257/436; 438/52, 65, 438/66

See application file for complete search history.

(56) References Cited

U.S. PATENT DOCUMENTS

| | | | |
|---|---|---|---|
| 6,383,357 B1 | 5/2002 | Maciossek | |
| 6,487,001 B2 | 11/2002 | Greywall | |
| 6,552,840 B2 | 4/2003 | Knipe | |
| 6,747,390 B2 * | 6/2004 | Park et al. | 310/309 |
| 6,760,143 B2 * | 7/2004 | Yoon | 359/290 |
| 6,798,560 B2 * | 9/2004 | Aubuchon | 359/291 |
| 6,825,967 B1 | 11/2004 | Chong et al. | |
| 6,825,968 B2 | 11/2004 | Aubuchon | |

OTHER PUBLICATIONS

Wagner, B., et al., "*Bistabe Microvalve With Pneumatically Coupled Membranes*", © 1996 IEEE, pp. 384-388, 1996.

Wagner, B., et al., "*Infrared Micromirror Array with Large Pixel Size and Large Deflection Angle*", Transducers '97, 1997 International Conference on Solid-State Sensors and Actuators, © 1997 IEEE, pp. 75-78, Jun. 16-19, 1997.

(Continued)

*Primary Examiner*—Loha Ben
(74) *Attorney, Agent, or Firm*—Wade James Brady, III; Frederick J. Telecky, Jr.

(57) ABSTRACT

A method of tilting a micromirror includes forming a substrate, a micromirror outwardly from the substrate, and at least one electrode inwardly from the micromirror. The method further includes applying, by the at least one electrode, electrostatic forces sufficient to pivot the micromirror about a pivot point. In addition, the method includes providing the at least one electrode with a sloped outer surface. The sloped outer surface has a first end and a second end. The second end is closer to the pivot point than the first end, and the first end is closer to the substrate than the second end. The method also includes providing at least a portion of the at least one electrode with material properties that at least partially contribute to the sloped profile of the sloped outer surface.

20 Claims, 2 Drawing Sheets

OTHER PUBLICATIONS

Reimer, K., et al., "*16 k Infrared Micromirror Arrays with Large Beam Deflection and Tenth Millimeter Pixel Size*", Part of the SPIE Conference on Miniaturized Systems with Micro-Optics and MEMS, SPIE vol. 3878, pp. 272-280, Sep. 1999.

Fraunhofer Institut Siliziumtechnologie, "*Achievements and Results Annual Report 2001*", pp. 1-5 and 40-41, 2001.

Sawada, Renshi, et al., "*Improved Single Crystalline Mirror Actuated Electrostatically By Terraced Electrodes With High-Aspect Ratio Torsion Spring*", © 2003, IEEE, pp. 153-154, 2003.

Urano, M., et al., "*Novel Fabrication Process and Structure of a Low-Voltage-Operation Micromirror Array for Optical MEMS Switches*", © 2003 IEEE, IEDM 03-965,—03-968, 39.5.1-39.5.4, 2003.

Cichalewski, Wojciech, et al., "*Analytical modelling and simulations of a MEMS micro-mirror—MATLAB implementation*", CADSM 2003, pp. 360-365, Feb. 18-22, 2003.

Yamamoto, Tsuyoshi, et al., "*A Three-Dimensional MEMS Optical Switching Module Having 100 Input and 100 Output Ports*", IEEE Photonics Technology Letters, vol. 15, No. 10, pp. 1360-1362, Oct. 2003.

Yamamoto, Tsuyoshi, et al., "*Development of a Large-scale 3D MEMS Optical Switch Module*", Selected Papers, NTT Technical Review, vol. 1, No. 7, pp. 37-42, Oct. 2003.

Lebrecht von Trotha, et al., "*Advanced MEMS Fabrication Using CMP*", http://www.reed-electronics.com/ semiconductor/ index.asp/layout=articlePrint&article ID=CA440, pp. 1-5, Aug. 11, 2004.

Fraunhofer Institut für Silizium Technologie, "*Digital Micromirror Arrays*", http://www.isit.fhg.de/english/mst/micromirror.html, 2 pages, Oct. 30, 2005.

Rao, Masa P., et al., "*Bulk Micromachined Titanium Micromirror Device With Sloping Electrode Geometry*", Mechanical & Environmental Engineering Department, University of California, Santa Barbara, Santa Barbara, California, 4 pages, Printed Jun. 21, 2006.

Urano, M., et al., "*Fabrication of Low-Voltage Optical MEMS Switches by Using Seamless Integration Technology*", NTT Microsystem Integration Laboratories, Kanagawa, Japan, 1 page, Printed Jun. 21, 2006.

U.S. Appl. No. 11/110,027, filed Apr. 20, 2005 entitled: "*Isolation Layer for Semiconductor Devices and Method for Forming the Same*"., 18 pages.

U.S. Appl. No. 11/172,348, filed Jun. 30, 2005 entitled: "*Versatile System for Restricting Movement of MEMS Structures*"., 30 pages.

U.S. Appl. No. 11/304,042, filed Dec. 15, 2005 entitled: "*Ultra Dark Polymer*"., 29 pages.

U.S. Appl. No. 11/402,411, filed Apr. 12, 2006 entitled: "*System and Method for Increasing Image Quality in a Display System*", 30 pages.

U.S Patent Application filed Aug. 2, 2006 entitled: "*Sloped Cantilever Beam Electrode for a MEMS Device*", 28 pages.

\* cited by examiner

SLOPING ELECTRODES IN A SPATIAL LIGHT MODULATOR

TECHNICAL FIELD

This invention relates in general to spatial light modulators (SLM) and, in particular, to a digital micromirror device (DMD) having a dark isolation layer and electrodes with a portion sloping away from the micromirror.

BACKGROUND

Spatial light modulators (SLM) often comprise electrostatic fields in their operation. Digital micromirror devices (DMD) are a particular SLM device capable of being used in optical communication and/or projection display systems. DMDs involve an array of micromirrors that selectively communicate at least a portion of an optical signal or light beam. DMDs selectively communicate an optical signal or light beam by pivoting between active "on" and "off" states. To permit the micromirrors to pivot, each micromirror is attached to a hinge that is suspended between a one or more support posts.

OVERVIEW OF EXAMPLE EMBODIMENTS

In one embodiment, an apparatus for use with a micromirror element includes a substrate, a micromirror, a light absorptive layer, and at least one electrode having a sloped portion. The micromirror is disposed outwardly from the substrate and operable to pivot about a pivot point to selectively reflect light from a light source. The light absorptive layer is disposed outwardly from at least a portion of the substrate. The sloped portion of the at least one electrode has a sloped outer surface disposed inwardly from the micromirror. The sloped outer surface has a first end and a second end. The second end is closer to the pivot point than the first end, and the first end is closer to the substrate than the second end. In addition, the sloped portion of the at least one electrode has material properties that at least partially contribute to the sloped profile of the sloped outer surface.

In a method embodiment, a method of tilting a micromirror includes forming a substrate, a micromirror outwardly from the substrate, and at least one electrode inwardly from the micromirror. The method further includes applying, by the at least one electrode, electrostatic forces sufficient to pivot the micromirror about a pivot point. In addition, the method includes providing the at least one electrode with a sloped outer surface. The sloped outer surface has a first end and a second end. The second end is closer to the pivot point than the first end and the first end closer to the substrate than the second end. The method also includes providing at least a portion of the at least one electrode with material properties that at least partially contribute to the sloped profile of the sloped outer surface.

Depending on the specific features implemented, particular embodiments of the present invention may exhibit some, none, or all of the following technical advantages. Various embodiments may enable the formation of a contrast-improving light-absorptive layer to be formed outwardly from the substrate and inwardly from the micromirror. In addition, in various embodiments, the planar process associated with forming the micromirror addressing electrodes may further enable a flatter micromirror, thereby enhancing optical performance of a DMD. Some embodiments may reduce the risk of field emission and dielectrophoresis effects.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of example embodiments of the present invention, and for further features and advantages thereof, reference is now made to the following description taken in conjunction with the accompanying drawings, in which.

DETAILED DESCRIPTION OF EXAMPLE EMBODIMENTS

Particular examples and dimensions specified throughout this document are intended for example purposes only, and are not intended to limit the scope of the present disclosure. In particular, this document is not intended to be limited to a particular microelectromechanical system (MEMS) device in a spatial light modulator application, such as, a digital micromirror device. Moreover, the illustrations in the FIGURES are not necessarily drawn to scale.

Figure 1:
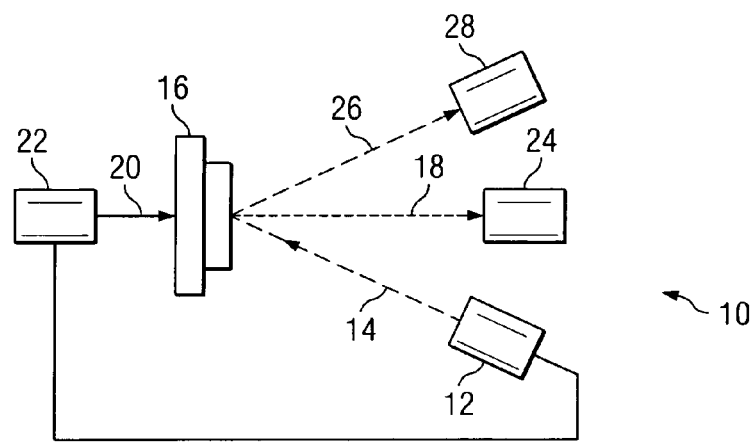
FIG. 1 is a block diagram of one embodiment of a portion of a display system.

FIG. 1 is a block diagram of one embodiment of a portion of a display system 10 that may be used with other embodiments of the invention. The display system 10 of FIG. 1 includes a light source module 12 capable of generating illumination light beams 14. Light beams 14 are directed from light source module 12 to a modulator 16. Modulator 16 may comprise any device capable of selectively communicating at least some of the received light beams along a projection light path 18. In various embodiments, modulator 16 may comprise a spatial light modulator, such as, for example, a liquid crystal on silicon display. In the illustrated embodiment, however, modulator 16 comprises a digital micromirror device (DMD).

As will be described in more detail below, a DMD is a microelectromechanical device comprising an array of hundreds of thousands of tilting digital micromirrors. In a flat or neutral state, each micromirror may be substantially parallel to projection lens 24. From the flat state, the micromirrors may be tilted, for example, to a positive or negative angle corresponding to an "on" state and an "off" state. In particular embodiments, the micromirrors may tilt, for example, from +12 degrees to a −12 degrees. Although particular embodiments, may have micromirrors that tilt from +12 degrees to a −12 degrees, any other appropriate tilt angle may be used without departing from the scope of the present disclosure. To permit the micromirrors to tilt, each micromirror attaches to one or more hinges mounted on support posts, and spaced by means of an air gap over underlying control circuitry. The control circuitry provides the desired voltages to the respective layers, based at least in part on image data 20 received from a control module 22. In various embodiments, modulator 16 is capable of generating various levels or shades for each color received.

Electrostatic forces cause each micromirror to selectively tilt. Incident illumination light on the micromirror array is reflected by the "on" micromirrors along projection path 18 for receipt by projection lens 24. Additionally, illumination light beams 14 are reflected by the "off" micromirrors and directed on off-state light path 26 toward light absorber 28. The pattern of "on" versus "off" mirrors (e.g., light and dark mirrors) forms an image that is projected by projection lens 24.

Light source module 12 includes one or more lamps or other light sources capable of generating and focusing an illumination light beam. Although display system 10 is described and illustrated as including a single light source module 12, it is generally recognized that display system 10 may include any suitable number of light sources modules appropriate for generating light beams for transmission to modulator 16.

As discussed above, display system 10 includes a control module 22 that receives and relays image data 20 to modulator 16 to effect the tilting of micromirrors in modulator 16. Specifically, control module 22 may relay image data 20 that identifies the appropriate tilt of the micromirrors of modulator 16. For example, control module 22 may send image data 20 to modulator 16 that indicates that specific micromirrors of modulator 16 should be positioned in the "on" state. Accordingly, the micromirrors may be positioned at a tilt angle on the order of approximately +12 degrees, as measured from projection path 18. Alternatively, control module 22 may send image data 20 to modulator 16 that indicates specific micromirrors should be positioned in the "off" state. As such, the micromirrors may be positioned at a tilt angle on the order of approximately −12 degrees, as measured from projection path 18.

For conventional DMDs, light reflected from surfaces disposed inwardly from the micromirrors may inhibit the contrast ratio performance of the device. To mitigate these "stray reflections," a light-absorptive isolation layer may be formed over the substrate. However, such a light-absorptive isolation layer may inhibit the electrostatic fields necessary for digital operation of the DMD. That is, a light-absorptive isolation layer may electrically shield a "lower" electrode typically used for digital operation of conventional DMDs. Accordingly, teachings of some embodiments of the invention recognize that utilization of electrodes disposed outwardly from the light-absorptive isolation layer may provide sufficient electrostatics for digital operation of the DMD, when such electrodes have an increased surface area such that a portion of the electrode surface (e.g., reference 210*a* in FIG. 2B) slopes away from the micromirror. The smooth, expanded surface of such electrodes may reduce the risk of field emission and dielectrophoresis effects associated with conventional electrodes comprising sharp edges. In addition, in various embodiments the planar process associated with forming such electrodes having an increased surface area may further enable flatter micromirrors, thereby enhancing optical performance of DMD 200. Additional details of certain embodiments are described below with references to FIGS. 2A through 2C.

Figure 2A:
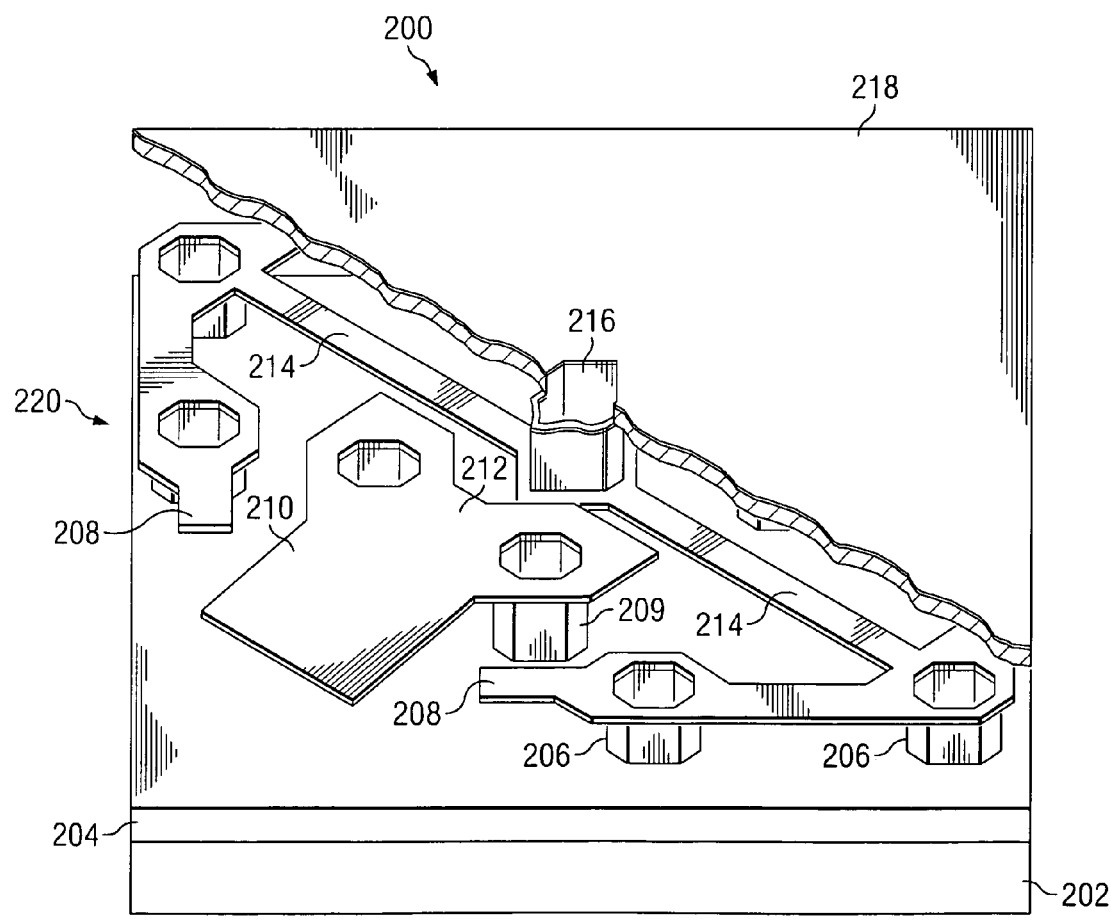
FIG. 2A is perspective view of one embodiment of a portion of a digital micromirror device.

FIG. 2A is a perspective view of one embodiment of a portion of a digital micromirror (DMD) device 200. As discussed above with regard to modulator 16 of FIG. 1, DMD 200 may include an array of hundreds of thousands of tilting micromirrors (e.g., micromirror 218). Each micromirror 218 is generally a portion of a pixel element 220 fabricated monolithically over a complementary metal-oxide semiconductor ("CMOS") substrate 202. In particular embodiments, the CMOS substrate 202 includes component parts of control circuitry operable to manipulate micromirror 218. For example, the CMOS substrate 202 may include an SRAM cell or other similar structure for performing the operations of each micromirror 218. In this particular embodiment, a light-absorptive isolation layer 204 is disposed outwardly from substrate 202. An example of such a light-absorptive layer is described in U.S. patent application Ser. No. 11/110,027, which is incorporated by reference. Each pixel element 220 may generally include a mirror portion, a hinge portion, and an address portion.

The mirror portion of pixel element 220 in the illustrated embodiment uses a reflective material such as aluminum or other material to reflect incident light to produce an image through projection lens 24. In some embodiments, the reflective material may be a micromirror 218. In particular embodiments, the micromirror 218 may be approximately 13.7 microns in size and have approximately a one micron gap between adjacent micromirrors. The described dimensions, however, are merely one example configuration of micromirrors 218. It is generally recognized that, in other embodiments, each micromirror 218 may be smaller or larger than the above described example. For example, in particular embodiments, each micromirror may be less than thirteen microns in size. In other embodiments, each micromirror may be approximately seventeen microns in size.

The hinge portion of each pixel element 220 in the illustrated embodiment, includes one or more hinges 214, which are supported by hinge posts or hinge vias 206. Each hinge 214 may be made of aluminum, titanium, tungsten, aluminum alloys, such as AlTiO, or other material suitable for supporting and manipulating micromirrors 218. In operation, the one or more hinges 214 may be used to tilt each micromirror 218 such that the micromirrors 218 may be alternated between an active "on" state or an active "off" state to selectively communicate at least a portion of an optical signal or light beam. For example, and as described above with regard to FIG. 1, hinges 214 may operate to tilt micromirrors 218 from a plus twelve degrees to a minus twelve degrees to alternate the micromirrors 218 between the active "on" state condition and the active "off" state condition, respectively.

The micromirrors 218 are generally supported above the hinge 214 by a mirror via 216. In the illustrated embodiment, the range of motion given to micromirrors 218 may be limited by spring-tips 208 within the hinge layer. Thus, micromirrors 218 may be tilted in the positive or negative direction until the micromirror 218 contacts and compresses spring-tip pairs 208 disposed on opposite sides of the mirror pivot point. Although this example includes spring-tip pairs 208 for limiting the motion of micromirrors 218 to a desired range, other embodiments may utilize other means. For example, it is generally recognized that micromirrors 218 may tilt in the positive or negative direction until micromirror 218 contacts a spring-ring or until a beam or yoke coupled to the hinge contacts landing pads.

Figure 2B:
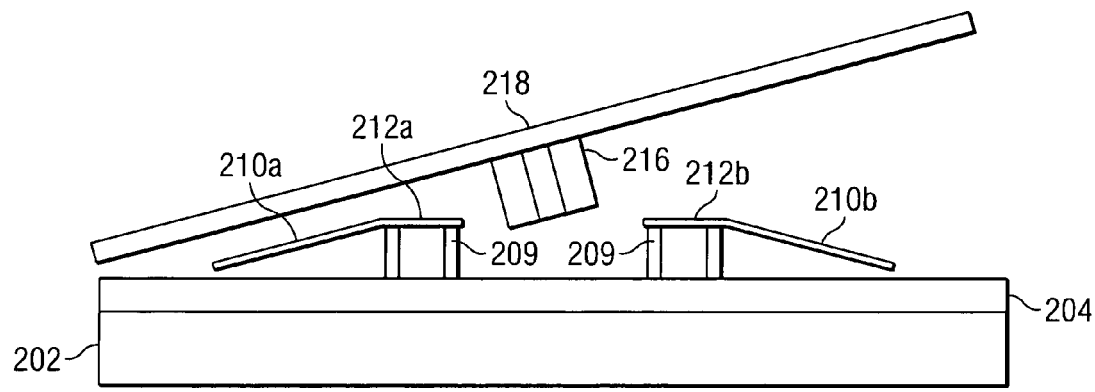
FIGS. 2B and 2C are cross-sectional views illustrating example methods of forming a portion of a digital micromirror device.
Figure 2C:
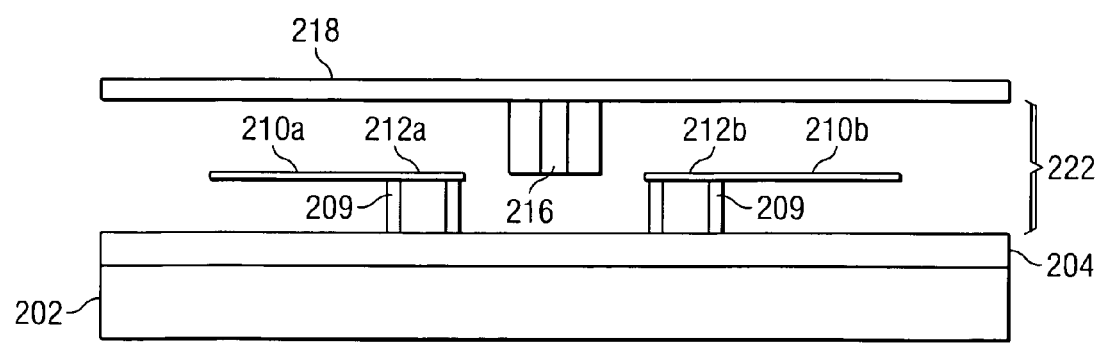

The address portion of pixel element 220, in the illustrated embodiment, comprises electrodes 212 with sloping portions 210 (210*a* and 210*b* in FIG. 2B). That is, electrode 212 has a sloping surface 210 that slopes inwardly, or away from the substrate 202, as illustrated best in FIG. 2B. Although the sloped profile of sloping surface 210 is shown in FIG. 2B as being substantially linear or planar, other embodiments may alternatively have a curved or bent profile without departing from the scope of the present disclosure. In the illustrated embodiment, address electrodes 212 are initially formed in the hinge layer with non-sloping portions 210 (as shown in FIG. 2C by reference numbers 210*a*, 210*b*, 212*a* and 212*b*) using standard "planar" processing techniques. In some embodiments, the removal of sacrificial layers (shown as reference 222 in FIG. 2C) frees electrodes 212 so that a portion of the surface 210 may slope inwardly. In this embodiment, the electrodes 212 and associated sloping surface 210 are electrically coupled to address vias 209, which are electrically coupled to control circuitry within substrate 202.

The creation of electrostatic fields within each pixel element 220 may be effected through any of a variety of means. For example, portions of the DMD pixel elements 220 may receive a bias voltage that at least partially contributes to the creation of the electrostatic forces (e.g., a voltage differential) between address electrodes 212 and micromirrors 218. That is, a bias voltage may propagate through hinge vias 206, along hinge 214 and through mirror via 216 to each micromirror 218. In particular embodiments, the latching bias voltage comprises a steady-state voltage. That is, the bias voltage remains substantially constant while micromirror 218 is in an "on-state" or "off-state" position. In this example, the latching bias voltage comprises approximately twenty-six volts. Although this example uses a bias voltage of twenty-six volts, other latching bias voltages may be used without departing from the scope of the present disclosure.

FIG. 2B is a cross sectional view illustrating one example of a method of forming a portion of a digital micromirror device (DMD) 200 and tilting a micromirror 218. In this particular embodiment, each electrode 212 comprises a sloped portion 210 that slopes away from micromirror 218. Achieving the sloped profiles 210 of electrodes 212 may be effected by any of a variety of processes. For example, the material properties of electrode 212 may predispose the surface 210 of electrode 212 to slope inward at some point after surface 210 is freed from supporting sacrificial layers (as shown in FIG. 2C by reference number 222). Such material properties may include, but are not limited to, variant stress levels within a multilayered electrode, a stress gradient within a single layer, stress induced by surface treatments or surface tension, and magnetization. Examples of surface treatments that may modify the material stress of the electrodes in order to create a sloped profile include modifying the electrode surface chemically or partially "damaging" the outer surface through ion bombardment. Modifying the surface chemically may include, for example, growing a compressive aluminum oxide film outwardly from the outer surface of the electrode.

As described above, CMOS substrate 202 comprises control circuitry associated with DMD 200. The control circuitry may comprise any hardware, software, firmware, or combination thereof capable of at least partially contributing to the creation of the electrostatic forces between the address electrodes 212 and micromirrors 218. The control circuitry associated with CMOS substrate 202 functions to selectively transition micromirrors 218 between "on" and "off" states based at least in part on data received from a controller or processor (shown in FIG. 1 as reference numeral 22). The control circuitry associated with CMOS substrate 202 transitions micromirrors 218 between "on" and "off" states by selectively applying an address or control voltage to at least one of the address electrodes 212 associated with a particular pixel element 220 using vias 209. In particular embodiments, the control voltage is on the order of approximately three volts to seven-and-a-half volts. However, it is generally recognized that other control voltages may be used without departing from the scope of the present disclosure.

By combining the DMD 200 with a suitable light source and projection optics (described above with regard to FIG. 1), the micromirror 218 may reflect incident light either into or out of the pupil of the projection lens 24. Thus, the "on" state of micromirror 218 appears bright and the "off" state of micromirror 218 appears dark. Gray scale may be achieved by binary pulse width modulation of the incident light. In some embodiments, color may be achieved by color filters, either stationary or rotating, in combination with one, two, or three DMDs 200. Other embodiments may achieve color by other means, such as, for example, colored light emitting diodes (LEDs).

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A micromirror element comprising:
   a substrate;
   a lower layer disposed outwardly from the substrate, the lower layer including a bias portion for receiving a bias voltage and at least two address portions for respectively receiving an address voltage;
   a micromirror comprising a reflective surface operable to pivot about a pivot point to selectively reflect a beam of light, the micromirror electrically coupled to the bias portion;
   a light absorptive layer disposed outwardly from at least a portion of the substrate;
   at least two electrodes, each of the at least two electrodes electrically coupled to one of the at least two address portions, the electrodes positioned between the micromirror and the lower layer on opposite sides of the pivot point;
   wherein application of the bias voltage to the bias portion and the address voltage to at least one of the address portions creates an electrostatic attraction between at least one of the at least two electrodes and the micromirror;
   wherein the electrostatic attraction at least partially contributes to a force utilized in selectively tilting the micromirror;
   wherein each of the at least two electrodes has a sloped portion, the sloped portion having an outer surface disposed inwardly from the micromirror, the outer surface having a first end and a second end, each second end closer to the pivot point than the first end, the first end closer to the substrate than the second end; and
   wherein the sloped portion has material properties that at least partially contribute to the slope of the outer surface.

2. The micromirror element of claim 1, wherein the light-absorptive layer has insulator properties.

3. A micromirror element comprising:
   a substrate;
   a micromirror disposed outwardly from the substrate and operable to pivot about a pivot point to selectively reflect light from a light source;
   a light absorptive layer disposed outwardly from at least a portion of the substrate;
   at least one electrode having a sloped portion, the sloped portion having a sloped outer surface disposed inwardly from the micromirror, the sloped outer surface having a first end and a second end, the second end closer to the pivot point than the first end, the first end closer to the substrate than the second end; and wherein at least a portion of the sloped portion has material properties that at least partially contribute to the sloped profile of the sloped outer surface.

4. The micromirror element of claim 3, wherein the material properties comprise at least two layers formed with variant stress levels.

5. The micromirror device of claim 3, wherein the material properties comprise magnetic properties.

6. The micromirror element of claim 3, wherein the material properties comprise a layer formed with a stress gradient.

7. The micromirror element of claim 3, wherein the material properties comprise material stress generated by surface treatments.

8. The micromirror element of claim 7, wherein the surface treatments comprise surface oxidation.

9. The micromirror element of claim 7, wherein the surface treatments comprise ion bombardment damage.

10. The micromirror element of claim 3, wherein the material properties comprise surface tension.

11. The micromirror device of claim 3, and further comprising a layer having insulator properties and disposed outwardly from the at least one electrode.

12. A method of tilting a micromirror comprising:
providing a substrate, a micromirror outwardly from the substrate, and at least one electrode inwardly from the micromirror;
applying, by the at least one electrode, electrostatic forces sufficient to pivot the micromirror about a pivot point;
providing the at least one electrode with a sloped outer surface, the sloped outer surface having a first end and a second end, the second end closer to the pivot point than the first end, the first end closer to the substrate than the second end;
providing at least a portion of the at least one electrode with material properties that at least partially contribute to the sloped profile of the sloped outer surface.

13. The method of claim 12, wherein providing the at least a portion of the at least one electrode with material properties comprises providing the at least a portion of the at least one electrode with at least two layers having different stress levels respectively.

14. The method of claim 13, and further comprising forming a light-absorptive layer outwardly from at least a portion of the substrate.

15. The method of claim 12, wherein providing the at least a portion of the at least one electrode with material properties comprises providing the at least a portion of the at least one electrode with magnetic properties.

16. The method of claim 12, wherein providing the at least a portion of the at least one electrode with material properties comprises providing the at least a portion of the at least one electrode with a stress gradient.

17. The method of claim 12, wherein providing the at least a portion of the at least one electrode with material properties comprises providing the at least a portion of the at least one electrode with surface treatments that modify the material stress of the at least a portion of the at least one electrode.

18. The method of claim 17, wherein providing the at least a portion of the at least one electrode with surface treatments comprises growing an oxide film outwardly from at least a portion the at least one electrode.

19. The method of claim 17, wherein providing the at least a portion of the at least one electrode with surface treatments comprises bombarding at least a portion of the outer surface of the at least one electrode with ions.

20. The method of claim 12, wherein providing the at least a portion of the at least one electrode with material properties comprises providing the at least a portion of the at least one electrode with surface tension.

* * * * *